United States Patent
Smith et al.

(10) Patent No.: US 10,972,740 B2
(45) Date of Patent: Apr. 6, 2021

(54) METHOD FOR BANDWIDTH REDUCTION WHEN STREAMING LARGE FORMAT MULTI-FRAME IMAGE DATA

(71) Applicant: Forcepoint, LLC, Austin, TX (US)

(72) Inventors: Alexander Smith, North Salt Lake, UT (US); Kevin Crandell, Herriman, UT (US); Mark Price, Midvale, UT (US); Natalie McMullen, Salt Lake City, UT (US)

(73) Assignee: Forcepoint, LLC, Austin, TX (US)

( * ) Notice: Subject to any disclaimer, the term of this patent is extended or adjusted under 35 U.S.C. 154(b) by 0 days.

(21) Appl. No.: 15/912,718

(22) Filed: Mar. 6, 2018

(65) Prior Publication Data

US 2019/0281306 A1 Sep. 12, 2019

(51) Int. Cl.
*H04N 19/167* (2014.01)
*H04L 29/06* (2006.01)
*G06F 3/14* (2006.01)

(52) U.S. Cl.
CPC ......... *H04N 19/167* (2014.11); *H04L 65/607* (2013.01); *G06F 3/1454* (2013.01); *G09G 2350/00* (2013.01)

(58) Field of Classification Search
CPC ............... H04N 19/167; H04L 65/607; G09G 2350/00; G06F 3/1454
See application file for complete search history.

(56) References Cited

U.S. PATENT DOCUMENTS

| | | |
|---|---|---|
| 7,249,369 B2 | 7/2007 | Knouse et al. |
| 7,558,775 B1 | 7/2009 | Panigrahy et al. |
| 7,916,702 B2 | 3/2011 | Hirano et al. |
| 7,941,484 B2 | 5/2011 | Chandler et al. |
| 7,965,830 B2 | 6/2011 | Fleck et al. |
| 8,060,904 B1 | 11/2011 | Evans et al. |
| 8,347,392 B2 | 1/2013 | Chess et al. |
| 8,432,914 B2 | 4/2013 | Zinjuwadia et al. |
| 8,463,612 B1 | 6/2013 | Neath et al. |
| 8,695,090 B2 | 4/2014 | Barile et al. |
| 8,856,869 B1 | 10/2014 | Brinskelle |
| 9,183,258 B1 | 11/2015 | Taylor et al. |
| 9,197,601 B2 | 11/2015 | Pasdar |
| 9,208,316 B1 | 12/2015 | Hill et al. |
| 9,219,752 B2 | 12/2015 | Balinsky et al. |
| 9,363,164 B2 | 6/2016 | Lemieux |

(Continued)

OTHER PUBLICATIONS evostream.com, Media Server and Video Streaming Software, https://evostream.com/#, printed Feb. 22, 2018.
(Continued)

*Primary Examiner* — Francis Geroleo
(74) *Attorney, Agent, or Firm* — Terrile, Cannatti & Chambers; Stephen A. Terrile

(57) ABSTRACT

A method, system and computer-usable medium for performing a bandwidth reduction operation, comprising: receiving a plurality of streams of high-density image frames from a respective plurality of monitored devices; storing the plurality of streams of high-density image frames within a monitored content repository; identifying a subset of the plurality of streams of high-density image frames for increased scrutiny; and, presenting a portion of the subset of the plurality of streams of high-density image frames within a scalable viewport.

20 Claims, 7 Drawing Sheets

(56) References Cited

U.S. PATENT DOCUMENTS

| | | |
|---|---|---|
| 9,367,872 B1 | 6/2016 | Visbal et al. |
| 9,374,228 B2 | 6/2016 | Pendarakis et al. |
| 9,380,523 B1 | 6/2016 | Mijar et al. |
| 9,419,855 B2 | 8/2016 | Ganichev et al. |
| 9,465,668 B1 | 10/2016 | Roskind et al. |
| 9,491,183 B1 | 11/2016 | Dippenaar |
| 9,525,838 B2 | 12/2016 | Thiyagarajan |
| 9,826,023 B2 | 11/2017 | Yu |
| 9,847,910 B2 | 12/2017 | Chung |
| 10,057,157 B2 | 8/2018 | Goliya et al. |
| 10,063,419 B2 | 8/2018 | Horstmann et al. |
| 10,122,632 B2 | 11/2018 | Trossen et al. |
| 10,142,353 B2 | 11/2018 | Yadav et al. |
| 10,142,427 B2 | 11/2018 | Li et al. |
| 10,176,341 B2 | 1/2019 | Spaulding et al. |
| 10,187,485 B1 | 1/2019 | Shavell et al. |
| 10,192,074 B2 | 1/2019 | Sarin et al. |
| 10,205,663 B1 | 2/2019 | Jones et al. |
| 10,237,175 B2 | 3/2019 | Pignataro et al. |
| 10,255,445 B1 | 4/2019 | Brinskelle |
| 10,270,878 B1 | 4/2019 | Uppal et al. |
| 10,284,578 B2 | 5/2019 | Brugger et al. |
| 10,284,595 B2 | 5/2019 | Reddy et al. |
| 10,289,857 B1 | 5/2019 | Brinskelle |
| 10,291,417 B2 | 5/2019 | Vucina et al. |
| 10,296,558 B1 | 5/2019 | McInerny |
| 10,305,776 B2 | 5/2019 | Horn et al. |
| 10,326,735 B2 | 6/2019 | Jakobsson et al. |
| 10,331,769 B1 | 6/2019 | Hill et al. |
| 10,348,639 B2 | 7/2019 | Puchala et al. |
| 10,349,304 B2 | 7/2019 | Im et al. |
| 10,355,973 B2 | 7/2019 | Cicic et al. |
| 10,439,926 B2 | 10/2019 | Horn et al. |
| 10,440,503 B2 | 10/2019 | Tapia |
| 10,498,693 B1 | 12/2019 | Strauss et al. |
| 10,530,697 B2 | 1/2020 | Fourie et al. |
| 10,599,462 B2 | 3/2020 | Fried-Gintis |
| 10,601,787 B2 | 3/2020 | Pritikin et al. |
| 10,635,512 B2 | 4/2020 | Pepin et al. |
| 10,652,047 B2 | 5/2020 | Jain et al. |
| 10,708,125 B1 | 7/2020 | Chen |
| 2002/0120599 A1 | 8/2002 | Knouse et al. |
| 2003/0169724 A1 | 9/2003 | Mehta et al. |
| 2004/0146006 A1 | 7/2004 | Jackson |
| 2005/0027782 A1 | 2/2005 | Jalan et al. |
| 2005/0102266 A1 | 5/2005 | Nason et al. |
| 2005/0105608 A1* | 5/2005 | Coleman ............... G06F 3/1454 375/240.01 |
| 2005/0207405 A1 | 9/2005 | Dowling |
| 2006/0018466 A1 | 1/2006 | Adelstein et al. |
| 2006/0221967 A1 | 10/2006 | Narayan et al. |
| 2008/0320556 A1 | 12/2008 | Lee et al. |
| 2009/0175211 A1 | 7/2009 | Jakobsen |
| 2009/0241197 A1 | 9/2009 | Troyansky |
| 2009/0296685 A1 | 12/2009 | O'Shea et al. |
| 2009/0307600 A1* | 12/2009 | Arthur ................... G06F 3/1454 715/740 |
| 2011/0169844 A1 | 7/2011 | Diard et al. |
| 2012/0324365 A1* | 12/2012 | Momchilov ............ G06F 3/14 715/738 |
| 2013/0034097 A1 | 2/2013 | Dharmapurikar et al. |
| 2013/0091214 A1 | 4/2013 | Kellerman et al. |
| 2013/0120411 A1 | 5/2013 | Swift et al. |
| 2013/0340029 A1 | 12/2013 | De Armas et al. |
| 2014/0032759 A1 | 1/2014 | Barton et al. |
| 2014/0082726 A1 | 3/2014 | Dreller et al. |
| 2014/0109174 A1 | 4/2014 | Barton et al. |
| 2014/0146062 A1 | 5/2014 | Kiel et al. |
| 2014/0165137 A1 | 6/2014 | Balinsky et al. |
| 2014/0207850 A1 | 7/2014 | Bestler et al. |
| 2014/0237594 A1 | 8/2014 | Thakadu et al. |
| 2014/0280517 A1* | 9/2014 | White .................... H04L 67/04 709/203 |
| 2014/0379812 A1 | 12/2014 | Bastide, II et al. |
| 2015/0067832 A1 | 3/2015 | Sastry |
| 2015/0134730 A1 | 5/2015 | Seedorf et al. |
| 2015/0220707 A1 | 8/2015 | Kline et al. |
| 2015/0264035 A1* | 9/2015 | Waterhouse ............ H04L 47/70 726/4 |
| 2015/0264049 A1 | 9/2015 | Achilles et al. |
| 2015/0288714 A1 | 10/2015 | Emigh et al. |
| 2015/0381641 A1 | 12/2015 | Cabrera et al. |
| 2016/0080397 A1 | 3/2016 | Bacastow et al. |
| 2016/0094645 A1 | 3/2016 | Ashutosh et al. |
| 2016/0103992 A1 | 4/2016 | Roundy et al. |
| 2016/0212012 A1 | 7/2016 | Young et al. |
| 2016/0352719 A1 | 12/2016 | Yu |
| 2016/0378409 A1 | 12/2016 | Muramatsu |
| 2017/0061345 A1 | 3/2017 | Jones, III et al. |
| 2017/0126587 A1 | 5/2017 | Ranns et al. |
| 2017/0126718 A1 | 5/2017 | Baradaran et al. |
| 2017/0134506 A1 | 5/2017 | Rotem et al. |
| 2017/0237779 A1 | 8/2017 | Seetharaman et al. |
| 2017/0264628 A1 | 9/2017 | Treat et al. |
| 2017/0302665 A1 | 10/2017 | Zou et al. |
| 2018/0012144 A1 | 1/2018 | Ding et al. |
| 2018/0115613 A1 | 4/2018 | Vajravel et al. |
| 2018/0152471 A1 | 5/2018 | Jakobsson |
| 2018/0165463 A1 | 6/2018 | McCreary et al. |
| 2018/0173453 A1 | 6/2018 | Danilov et al. |
| 2018/0234368 A1 | 8/2018 | Everton |
| 2018/0330257 A1 | 11/2018 | Dodson et al. |
| 2018/0375760 A1 | 12/2018 | Saavedra |
| 2019/0037029 A1 | 1/2019 | Border |
| 2019/0057200 A1 | 2/2019 | Sabag et al. |
| 2019/0075124 A1* | 3/2019 | Kimhi ................ H04L 63/1416 |
| 2019/0182213 A1 | 6/2019 | Saavedra et al. |
| 2019/0199745 A1 | 6/2019 | Jakobsson et al. |
| 2019/0268381 A1 | 8/2019 | Narayanaswamy et al. |
| 2019/0278760 A1 | 9/2019 | Smart |
| 2019/0342313 A1 | 11/2019 | Watkiss et al. |
| 2019/0354709 A1 | 11/2019 | Brinskelle |
| 2019/0378102 A1 | 12/2019 | Kohli |
| 2020/0007548 A1 | 1/2020 | Sanghavi et al. |
| 2020/0021515 A1 | 1/2020 | Michael et al. |
| 2020/0021684 A1 | 1/2020 | Kreet et al. |
| 2020/0196092 A1 | 6/2020 | Jones |
| 2020/0213336 A1 | 7/2020 | Yu et al. |
| 2020/0314002 A1 | 10/2020 | Benoist et al. |
| 2020/0314004 A1 | 10/2020 | Rashad et al. |

OTHER PUBLICATIONS wowza.com, Wowza Streaming Engine, https://www.wowza.com/products/streaming-engine, printed Feb. 22, 2018.
opencv.org, https://opencv.org/, printed Mar. 6, 2018.
stackoverflow.com, OpenCV Crop Live Feed from Camera, https://stackoverflow.com/questions/17352420/opencv-crop-live-feed-from-camera, printed Feb. 22, 2018.
Check Point Software Technologies Ltd., Firewall and SmartDefense, Version NGX R62, 702048, Sep. 25, 2006.
Check Point Software Technologies Ltd., Softwareblades, Firewall R75.40, Administration Guide, Nov. 30, 2014.
Fortinet, FortiOS Handbook—Firewall, version 5.2.0, May 5, 2017.
Wikipedia, IP Address Spoofing, printed Aug. 16, 2017.
David Davis, Techrepublic, Prevent IP Spoofing with the Cisco IOS, Mar. 14, 2007.
Papadopoulos et al., An error control scheme for large-scale multicast applications, Proceedings, IEEE INFOCOM '98, the Conference on Computer Communications; Mar. 29-Apr. 2, 1998.
Schmidt et al., AuthoCast: a protocol for mobile multicast sender authentication, Proceeding, MoMM '08 Proceedings of the 6th International Conference on Advanced in Mobile Computing and Multimedia, pp. 142-149, 2008.
mybluelinux.com, What is email envelope and email header, downloaded Jan. 16, 2020.
Baker F., "Requirements for IP Version 4 Routers," RFC 1812, Jun. 1995. (Year: 1995).
Nichols et al., "Definition of the Differentiated Services Field (DS field) in the IPv4 and IPv6 Headers," RFC 2474, Dec. 1998. (Year: 1998).

(56) References Cited

OTHER PUBLICATIONS

Fuller et al., "Classless Inter-Domain Routing (CIDR): The Internet Address Assignment and Aggregation Plan," RFC 4632, Aug. 2006. (Year: 2006).
Hinden, R., "Applicability Statement for the Implementation of Classless Inter-Domain Routing (CIDR)," RFC 1517, Internet Engineering Steering Group, Sep. 1993. (Year: 1993).
Grossman, D., "New Terminology and Clarifications for Diffserv," RFC 3260, Apr. 2002. (Year: 2002).
Arkko J. et al, "IPv4 Address Blocks Reserved for Documentation," RFC 5737, Jan. 2010. (Year: 2010).
Cotton, M. et al., "Special Purpose IP Address Registries," RFC 6890, Apr. 2013. (Year: 2013).
Housley, R. et al., "The Internet Numbers Registry System," RFC 7020, Aug. 2013. (Year: 2013).

* cited by examiner

US 10,972,740 B2

METHOD FOR BANDWIDTH REDUCTION WHEN STREAMING LARGE FORMAT MULTI-FRAME IMAGE DATA

BACKGROUND OF THE INVENTION

Field of the Invention

The present invention relates in general to the field of computers and similar technologies, and in particular to software utilized in this field. Still more particularly, it relates to a method, system and computer-usable medium for reducing bandwidth consumption when remotely monitoring user interaction with high-density content displayed within a user interface of an endpoint device.

Description of the Related Art

Remote monitoring of a device's user interface (UI), sometimes referred to as remote desktop sharing, is widely used by many organizations for technical support, troubleshooting, and security surveillance. In general, remote monitoring approaches typically capture user interactions with the UI of their device, such as keyboard and mouse inputs, which are then communicated over a network to a remote computer, such as a server. In response, the remote computer sends display commands to the user's device.

When larger volumes of high-density content are involved, it is common to implement a software application, such as a web browser plug-in, to communicate display information (e.g., individual pixels), rather than display commands, directly to the UI of the user's device. However, such approaches typically consume large amounts of bandwidth. Accordingly, it is common to employ various encoding and compression approaches to reduce the amount of video information communicated over a network.

SUMMARY OF THE INVENTION

A method, system and computer-usable medium are disclosed for reducing bandwidth consumption when remotely monitoring user interaction with high-density content displayed within a user interface of an endpoint device.

In various embodiments, the invention relates to method, system and computer-usable medium for performing a bandwidth reduction operation comprising performing a bandwidth reduction operation, comprising: receiving a plurality of streams of high-density image frames from a respective plurality of monitored devices; storing the plurality of streams of high-density image frames within a monitored content repository; identifying a subset of the plurality of streams of high-density image frames for increased scrutiny; and, presenting a portion of the subset of the plurality of streams of high-density image frames within a scalable viewport.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
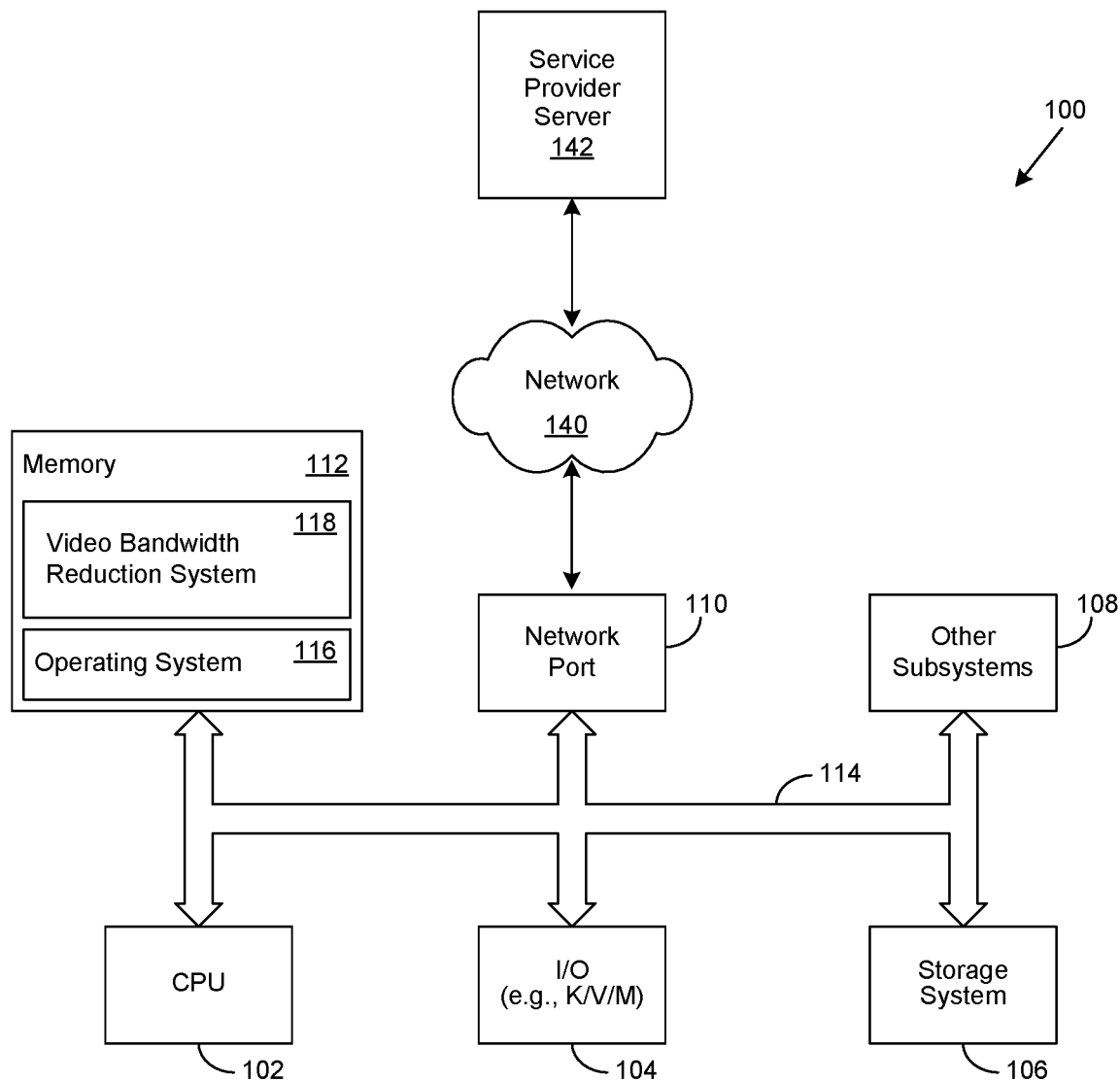
FIG. 1 depicts an exemplary client computer in which the present invention may be implemented.

A method, system and computer-usable medium are disclosed for reducing bandwidth consumption when remotely monitoring user interaction with high-density content displayed within a user interface of an endpoint device. Certain aspects of the invention reflect an appreciation that typical remote monitoring approaches often require the implementation of certain software applications, such as a web browser plug-in, to communicate display information (e.g., individual pixels) directly to a target device. Certain aspects of the invention likewise reflect an appreciation that such software applications often rely on various encoding and compression algorithms to reduce the amount of bandwidth used to communicate large volumes of multimedia data.

Likewise, certain aspects of the invention reflect an appreciation that lossy video compression algorithms are commonly used to compress multimedia data, such as audio, video and images, especially in applications such as streaming media. Certain aspects of the invention likewise reflect an appreciation that the use of lossy video compression has certain advantages and disadvantages. As an example, such data encoding approaches reduce data size for storing, handling and communicating content. However, they use inexact approximations and partial data discarding to represent content. Furthermore, while lossy video compression may work well for motion-oriented images (e.g., movies) its implementation typically results in blurred or obliterated text, which limits its use for certain applications, such as cybersecurity monitoring and surveillance. Accordingly, skilled practitioners of the art will recognize that the disadvantages of lossy video compression may outweigh its advantages, especially when higher levels of detail are advantageous when monitoring a remote user interface (UI) displaying multimedia content.

Certain aspects of the invention likewise reflect an appreciation that traditional streaming media approaches require pre-processing to encode multimedia content into a format optimized for streaming. However, such pre-processing may consume significant computing resources. Furthermore, typical streaming media approaches are implemented as either on-demand pulls of pre-processed video files (e.g., YouTube videos) or broadcast streams of the same video content to multiple parties (e.g., live web cam). Moreover, certain aspects of the invention reflect an appreciation that such streaming media approaches are cumbersome, as they are inherently designed to serve multiple clients, not an individual user's interaction with a particular device.

Likewise, certain aspects of the invention reflect an appreciation that the combination of implementing specialized software on a target device, the consumption of computing resources for preprocessing, and lossy compression is not conducive for certain remote monitoring purposes. Furthermore, certain aspects of the invention reflect an appreciation that a nominal portion (e.g., less than 1%) of information collected during security monitoring operations is typically analyzed. Accordingly, devoting large amounts of computing resources to collecting, processing and storing monitored content, especially high-density content, may not be justified.

Certain aspects of the invention likewise reflect an appreciation that monitoring operations associated with effective cyber security surveillance often benefits from capturing, and recording, user interaction with high-density content within a UI of an associated endpoint device. Furthermore, certain aspects of the invention reflect an appreciation that such capturing and recording should likewise not rely upon the implementation of specialized software on a target device or the consumption of large amounts of network bandwidth to be effective. Moreover, certain aspects of the invention reflect an appreciation that the communication of such high-density content be secure.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a remote monitoring video bandwidth reduction system 118. In one embodiment, the information handling system 100 is able to download the remote monitoring video bandwidth reduction system 118 from the service provider server 142. In another embodiment, the remote monitoring video bandwidth reduction system 118 is provided as a service from the service provider server 142.

In various embodiments, the remote monitoring video bandwidth reduction system 118 performs a remote monitoring video bandwidth reduction operation. In certain embodiments, the remote monitoring video bandwidth reduction operation improves processor efficiency, and thus the efficiency of the information handling system 100, by reducing video bandwidth consumption when performing remote monitoring or a target device. As will be appreciated, once the information handling system 100 is configured to perform the remote monitoring video bandwidth reduction operation, the information handling system 100 becomes a specialized computing device specifically configured to perform the remote monitoring video bandwidth reduction operation and is not a general purpose computing device. Moreover, the implementation of the remote monitoring video bandwidth reduction system 118 on the information handling system 100 improves the functionality of the information handling system 100 and provides a useful and concrete result of reducing video bandwidth consumption when monitoring a target device.

Figure 2:
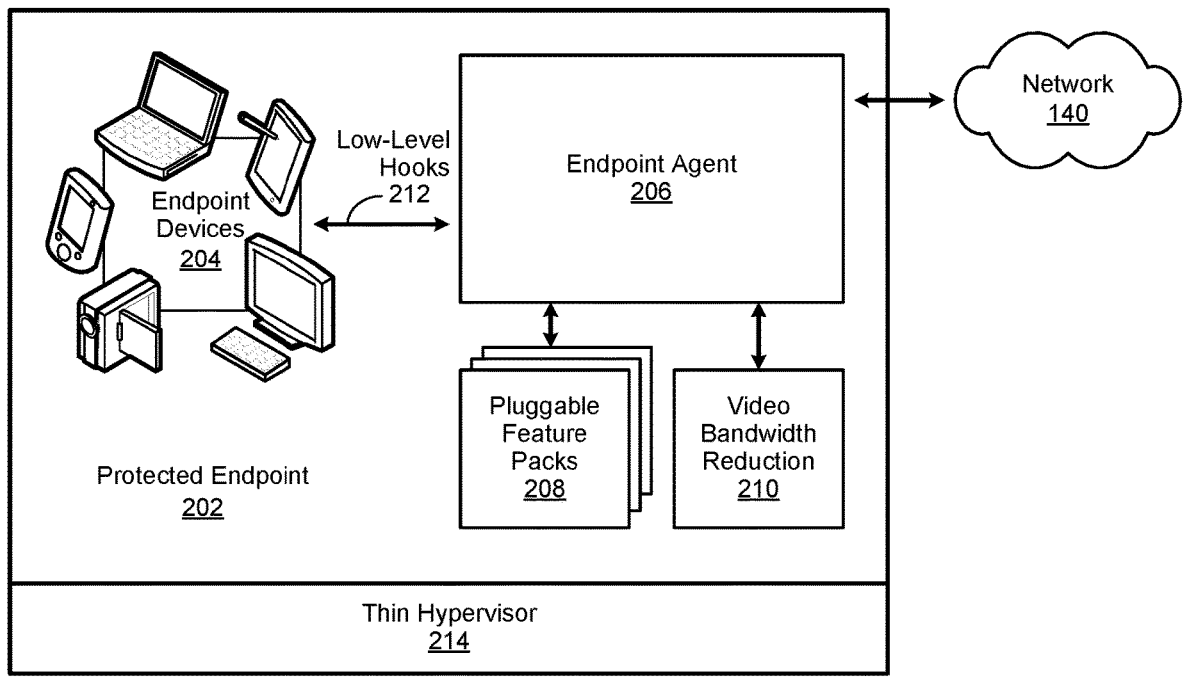
FIG. 2 is a simplified block diagram of an endpoint agent.

FIG. 2 is a simplified block diagram of an endpoint agent implemented in accordance with an embodiment of the invention. As used herein, an endpoint agent 206 broadly refers to a software agent used in combination with an endpoint device 204 to establish a protected endpoint 202. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 204, as likewise used herein, broadly refers to an information processing system such as a personal computer, a laptop computer, a tablet computer, a smart phone, a mobile telephone, a digital camera, a video camera, or other device that is capable of storing, processing and communicating data. In various embodiments, the communication of the data may take place in real-time or near-real-time. As an example, a cellular phone conversation may be used to communicate information in real-time, while an instant message (IM) exchange may be used to communicate information in near-real-time. As used herein, real-time broadly refers to processing and providing information within a time interval brief enough to not be discernable by a user. In certain embodiments, the communication of the information may take place asynchronously. For example, an email message may be stored on an endpoint device 204 when it is offline. In this example, the information may be communicated to its intended recipient once the endpoint device 204 gains access to a network 140.

A protected endpoint 202, as likewise used herein, broadly refers to a policy-based approach to network security that typically requires endpoint devices 204 to comply with particular criteria before they are granted access to network resources. As an example, a given endpoint device 204 may be required to have a particular operating system (OS), or version thereof, a Virtual Private Network (VPN) client, anti-virus software with current updates, and so forth. In certain embodiments, the protected endpoint 202 may be implemented to perform video bandwidth reduction operations when monitoring a user's interaction with high-density content displayed within a User interface (UI) window, as described in greater detail herein.

In certain embodiments, the endpoint agent 206 may be implemented to universally support a variety of operating systems, such as Apple Macintosh®, Microsoft Windows®, Linux®, and so forth. In certain embodiments, the endpoint agent 206 may be implemented to interact with the endpoint device 204 through the use of low-level hooks 212 at the OS level. It will be appreciated that the use of low-level hooks 212 allows the endpoint agent 206 to subscribe to multiple events through a single hook. Accordingly, multiple functionalities provided by the endpoint agent 206 can share a single data stream, using only those portions of the data stream they may individually need. Accordingly, system efficiency can be improved and operational overhead reduced.

In various embodiments, the endpoint agent 206 may be implemented to provide a common infrastructure for pluggable feature packs 208. In certain of these embodiments, the pluggable feature packs 208 may provide various security management functionalities. Examples of such functionalities may include various anti-virus and malware detection, data loss protection (DLP), insider threat detection, and so forth. In various embodiments, the security management functionalities may include one or more video bandwidth reduction functionalities, described in greater detail herein.

In certain embodiments, individual features of a particular pluggable feature pack 308 may be invoked as needed. It will be appreciated that the ability to invoke individual features of a pluggable feature pack 208, without necessarily invoking all such features, will likely improve the operational efficiency of the endpoint agent 206 while simultaneously reducing operational overhead. Accordingly, the endpoint agent 206 can self-optimize in various embodiments by using the common infrastructure and invoking only those pluggable components that are applicable or needed for a given user behavior.

In certain embodiments, individual features of a pluggable feature pack 208 may be invoked by the endpoint agent 206 according to the occurrence of a particular user behavior. In certain embodiments, the user behavior may include interaction with certain high-density content displayed within a user interface (UI) associated with an endpoint device 204. As an example, a user may use an endpoint device 204 to access and browse a particular website on the Internet. In this example, the individual actions performed by the user to access and browse the website constitute a user behavior. As another example, a user may use an endpoint device 204 to download a data file from a particular system. In this example, the individual actions performed by the user to download the data file constitute a user behavior.

In certain embodiments, the endpoint agent 206 may be implemented with additional functionalities, such as a frame capture pack 210. In various embodiments, the frame capture pack 210 may be implemented to capture certain high-density image frame information, as described in greater detail herein, corresponding to high-density content displayed within a UI associated with a particular endpoint device 204. In certain embodiments, a stream of high-density image frames may be captured on an intermittent basis, such as one to four high-density image frames a second. In these embodiments, the frequency in which the high-density image frames are captured is a matter of design choice.

In various embodiments, a stream of high-density image frames may be captured for a predefined period of time, such as 20 seconds. In certain embodiments, the full-frame contents of the first high-density image frame is captured in its entirety and only those areas of subsequent high-density image frames that have changed within the predefined time period are captured. As an example, a Graphical User interface (GUI) may contain multiple UI windows, one of which is displaying an IM session. In this example, the portion(s) of the high-density image frame associated with the UI window displaying the IM session may be changing, while other portions of the high-density image frame are not. Accordingly, only the portion(s) of the subsequent high-density image frames associated with the IM session is captured during the predefined time period. In certain embodiments, the high-density image frame capture process may be repeated for a certain number of predefined time periods. In these embodiments, the predefined time period, and the number of times the high-density image frame capture process is completed, is a matter of design choice.

In certain embodiments, the endpoint agent 206 may be implemented with a thin hypervisor 214, which can be run at Ring-1, thereby providing protection for the endpoint agent 206 in the event of a breach. As used herein, a thin hypervisor broadly refers to a simplified, OS-dependent hypervisor implemented to increase security. As likewise used herein, Ring-1 broadly refers to approaches allowing guest operating systems to run Ring 0 (i.e., kernel) operations without affecting other guests or the host OS. Those of skill in the art will recognize that many such embodiments are possible. Accordingly, the foregoing is not intended to limit the spirit, scope or intent of the invention.

Figure 3:
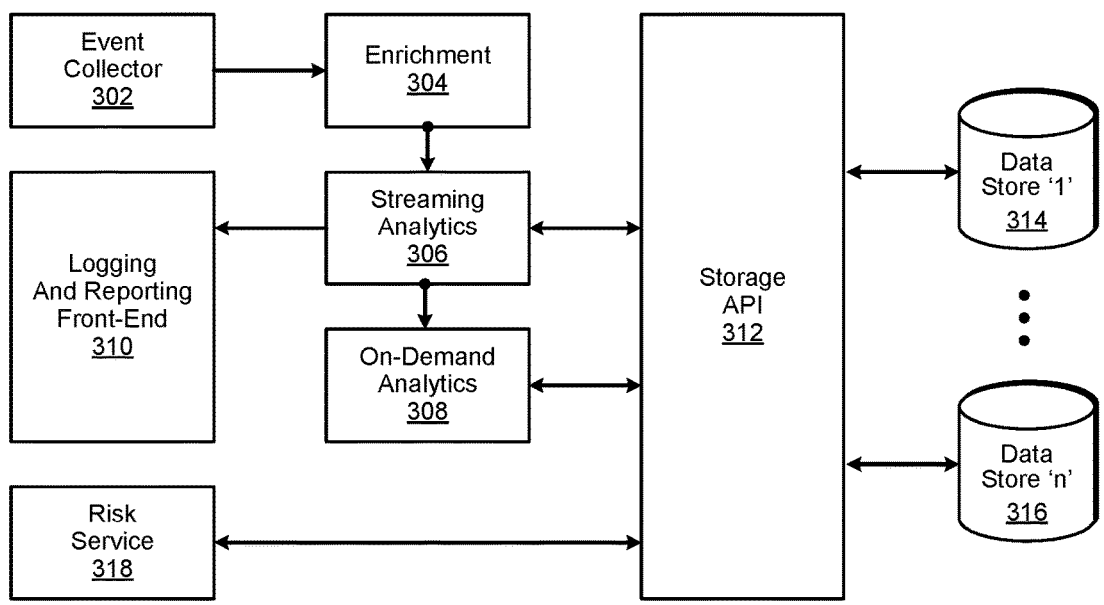
FIG. 3 is a simplified block diagram of a security application implemented on an application server.

FIG. 3 is a simplified block diagram of a security application implemented in accordance with an embodiment of the invention on an application server. In certain embodiments, the security application 300 shown in FIG. 3 may be implemented to provide various functionalities associated with data loss protection (DLP), insider threat detection, and so forth. In certain embodiments, the security application 300 may be implemented to provide log storage, reporting, and analytics capable of performing streaming 306 and on-demand 308 analytics operations. In certain embodiments, the security application 300 may be implemented to provide a uniform platform for storing events and contextual information associated with various user behaviors and performing longitudinal analytics. In certain embodiments, the events and contextual information may correspond to certain user interactions with content displayed within the User interface (UI) of an associated endpoint device, as described in greater detail herein.

As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious.

In various embodiments, the security application 300 may be implemented to be scalable. In one embodiment, the security application 300 may be implemented in a centralized location, such as a corporate data center. In this embodiment, additional resources may be added to the security application 300 as needs grow. In another embodiment, the security application 300 may be implemented as a distributed system. In this embodiment, the security application 300 may span multiple information processing systems. In yet another embodiment, the security application 300 may be implemented in a cloud environment. In yet still another embodiment, the security application 300 may be implemented in a virtual machine (VM) environment. In such an embodiment, the VM environment may be configured to dynamically and seamlessly scale the security application 300 as needed. Skilled practitioners of the art will recognize that many such embodiments are possible. Accordingly, the foregoing is not intended to limit the spirit, scope or intent of the invention.

In certain embodiments, an event collector 302 may be implemented to collect event and contextual information, described in greater detail herein, associated with various user behaviors. In these embodiments, the event and contextual information collected by the event collector 302 is a matter of design choice. In certain embodiments, the event and contextual information collected by the event collector 302 may be processed by an enrichment module 304 to generate enriched user behavior information. In various embodiments, the enrichment may include certain event and contextual information related to a particular user behavior, such as interacting with high-density content displayed within a UI associated with corresponding endpoint device.

In certain embodiments, enriched user behavior information may be provided to a streaming 306 analytics module by the enrichment module 304. In turn, the streaming 306 analytics module may provide some or all of the enriched user behavior information to an on-demand 308 analytics module. As used herein, streaming 306 analytics broadly refers to analytics performed in near-real-time on enriched user behavior information as it is received. Likewise, on-demand 308 analytics broadly refers herein to analytics performed, as it is requested, on enriched user behavior information after it has been received.

In one embodiment, the on-demand 308 analytics may be performed on enriched user behavior associated with a particular interval of time. In another embodiment, the streaming 306 or on-demand 308 analytics may be performed on enriched user behavior associated with a particular user, group of users, one or more entities, or a combination thereof In yet another embodiment, the streaming 306 or on-demand 308 analytics may be performed on enriched user behavior associated with a particular resource, such as a facility, system, data store, or service. In yet still another embodiment, the streaming 306 or on-demand 308 analytics may be performed as a result of a user interacting with certain high-density content, or a portion thereof, displayed within the User interface (UI) of a particular endpoint device. Those of skill in the art will recognize that many such embodiments are possible. Accordingly, the foregoing is not intended to limit the spirit, scope or intent of the invention.

In certain embodiments, the results of various analytics operations performed by the streaming 306 or on-demand 308 analytics modules may be provided to a storage Application Program Interface (API) 312. In turn, the storage API 312 may provide access to various datastores '1' 314 through 'n' 316, which may be used to store the results of the analytics operations. In certain embodiments, high-density image frame data collected by an endpoint agent, as described in greater detail herein, is received and processed by the security application 300 and subsequently stored in one or more datastores '1' 314 through 'n' 316. In certain embodiments, the security application may be implemented with a logging and reporting front-end 312, which in turn may be used to receive the results of analytics operations performed by the streaming 306 analytics module.

In certain embodiments, the security application may be implemented to provide a risk management service 318. In certain embodiments, the risk management service 318 may be implemented to provide various high-density image frame bandwidth reduction functionalities as a service. In various embodiments, the risk management service 318 may be implemented to provide the results of various analytics operations performed by the streaming 306 or on-demand 308 analytics modules. In certain embodiments, the risk management service 318 may be implemented to use the storage API 312 to access various high-density image frame information stored in the datastores '1' 314 through 'n' 316. Skilled practitioners of the art will recognize that many such embodiments are possible. Accordingly, the foregoing is not intended to limit the spirit, scope or intent of the invention.

Figure 4:
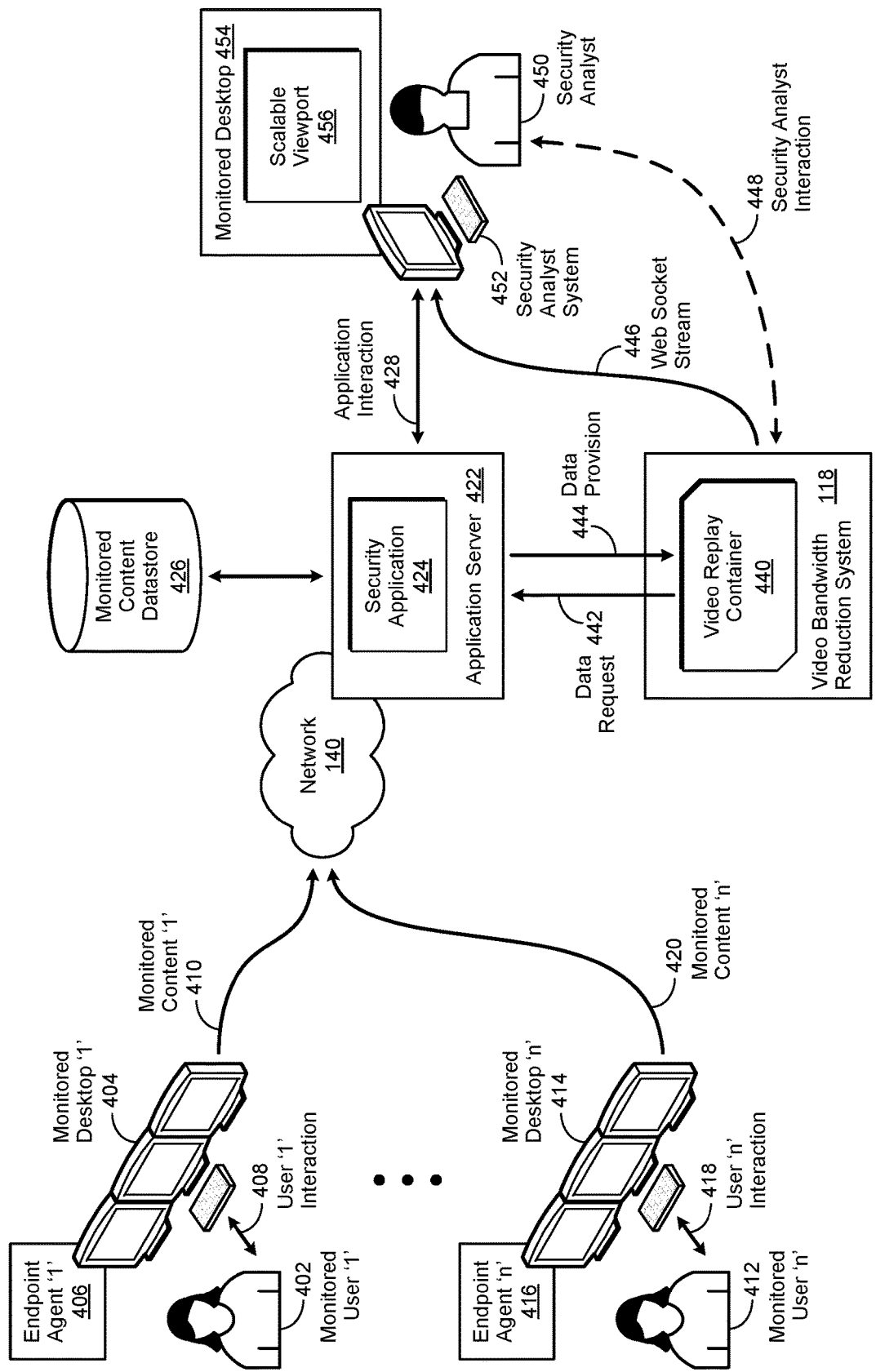
FIG. 4 is a simplified block diagram of a video bandwidth reduction system.

FIG. 4 is a simplified block diagram of a video bandwidth reduction system implemented in accordance with an embodiment of the invention. In certain embodiments, a video bandwidth reduction system 118 may be implemented to reduce the consumption of network bandwidth when monitoring a user's interaction with high-density content displayed within a User interface (UI) window. As used herein, high-density content broadly refers to visual content containing image detail sufficient to be resolved by the human eye when presented in the highest resolution supported by a particular display.

As an example, an email message containing 12 point text may be displayed within a UI window of a Video Graphics Array (VGA) display supporting a maximum resolution of 640×480 pixels. In this example, the resolution of the display may be sufficiently high enough for the human eye to discern individual characters of the email message. However, the display's resolution may not be sufficient for the human eye to discern individual characters within an email message if it contains 8 point text. As another example, an email message containing 8 point text may be displayed within a UI window of an Ultra High Definition (UHD) display supporting a maximum resolution of 3,849×2,160 pixels. In this example, the resolution of the display may be sufficient for a human eye to resolve individual characters within the text of the email, despite the small size of the characters on the display.

In certain embodiments, the UI window may be implemented as an aspect of a desktop environment. As used herein, a desktop environment broadly refers to an implementation of a desktop metaphor. As likewise used herein, a desktop metaphor broadly refers to a set of unifying concepts implemented within a graphical user interface (GUI) that assists a user to more easily interact with an information handling system, described in greater detail herein. In certain embodiments, the unifying concepts may include various objects, such as documents and folders, which can be displayed within one or more UI windows. Examples of other unifying concepts may include trashcans, menu bars, task bars, pointers, icons, and various desktop widgets familiar to skilled practitioners of the art.

In certain embodiments, a security application 424, such as the security application 300 described in the descriptive text associated with FIG. 3, may be implemented in combination with an application server 422. In various embodiments, the security application 424 may be implemented to monitor a particular user's interaction with certain high-density content displayed within a UI of a corresponding endpoint device. For example, as shown in FIG. 4, the security application 424 may be implemented in certain embodiments to monitor user interactions '1' 408 through 'n' 418 with monitored User interfaces '1' 404 through 'n' 414 respectively associated with users '1' 402 through 'n' 412.

In certain embodiments, as described in greater detail herein, endpoint agents '1' 406 through 'n' 416 may be implemented to capture high-density image frame information respectively associated with various user interactions '1' 408 through 'n' 418. In certain embodiments, this captured high-density image frame information may in turn be respectively conveyed by the endpoint agents '1' 406 through 'n' 416 as monitored high-density content '1' 410 through 'n' 420 via network 140 to the application server 422. Once received by the application server 422, the monitored high-density content '1' 410 through 'n' 420 may be provided to the security application 424, where it is processed as described in greater detail herein. In various embodiments, the monitored high-density content '1' 410 through 'n' 420, or a portion thereof, may be stored in a repository of monitored high-density content 426.

In certain embodiments, the security application 424 may be implemented to provide notifications of suspicious user behavior to a security analyst system 452. In certain embodiments, the suspicious user behavior may include a particular user's interaction with certain high-density content. In various embodiments, a security analyst 450 may use the security analyst system 452 to interact 428 with the security application 424 to determine whether a particular notification of suspicious user behavior involves investigation.

In certain embodiments, the security analyst 450 may perform various interactions 448 with a video bandwidth reduction system 118 to request certain high-density content associated with a particular notification of suspicious user behavior. In certain embodiments, the security analyst 450 may likewise perform various interactions 448 with the video bandwidth reduction system 118 to provide requested high-density content via a secure web socket stream 446 to the security analyst system 452.

In certain embodiments, the video bandwidth reduction system 118 may be implemented to include a video replay container 440. In various embodiments, the video replay container 440 may be configured to process a request for certain high-density content associated with a particular notification of suspicious user behavior. In certain embodiments, the video replay container may likewise be configured to provide a request 442 to the application server 422 for the requested high-density content. In certain embodiments, the application server 422 may in turn be configured to retrieve the requested high-density content from the repository of monitored high-density content 426, which it then provides 444 to the video replay container 440. In certain embodiments, the video bandwidth reduction system 118 then provides the retrieved high-density content via a web socket stream 446 to the security analyst system 456.

In certain embodiments, the retrieved high-density content is provided to the security analyst system 456 in its native resolution (e.g., 11,520×2,160 pixels, 1,920×1,080 pixels, etc.). In certain embodiments, the retrieved high-density content is processed by the video replay container 440 to provide it to the security analyst system 456 in a lower resolution (e.g., 1,280×720 pixels, 640×1,136 pixels, etc.) In certain embodiments, the retrieved high-density content may be automatically rescaled by the video replay container 440 to match the resolution of a display associated with the security analyst system. In certain embodiments, the retrieved high-density content may be rescaled by the video replay container 440 to match a resolution requested by the security analyst 450.

In certain embodiments, the high-density content provided to the security analyst system 452 may be displayed within a scalable viewport 458, which in turn is implemented within an associated UI 454. Skilled practitioners of the art will be familiar with a viewport, which broadly refers to an area, typically rectangular, expressed in rendering device-specific coordinates (e.g., pixels corresponding to certain screen coordinates), within which an object of interest may be rendered. As used herein, a scalable viewport 458 broadly refers to a viewport implemented to scale the viewable area and resolution of a particular viewport displaying high-density content associated with a particular monitored user interaction. In certain embodiments, the scalable viewport 458 may be scaled to make the high-density content it contains larger or smaller, as described in greater detail herein. In certain embodiments, the resolution of the scalable viewport 458 may be reduced. In certain embodiments, a portion of the scalable viewport 458 may be selected and enlarged to provide more detail. In certain embodiments, the entirety of the scalable viewport 456, or a portion thereof, may be displayed as a monitored UI 456 image within the UI 454 of the security analyst system 452.

Figure 5A:
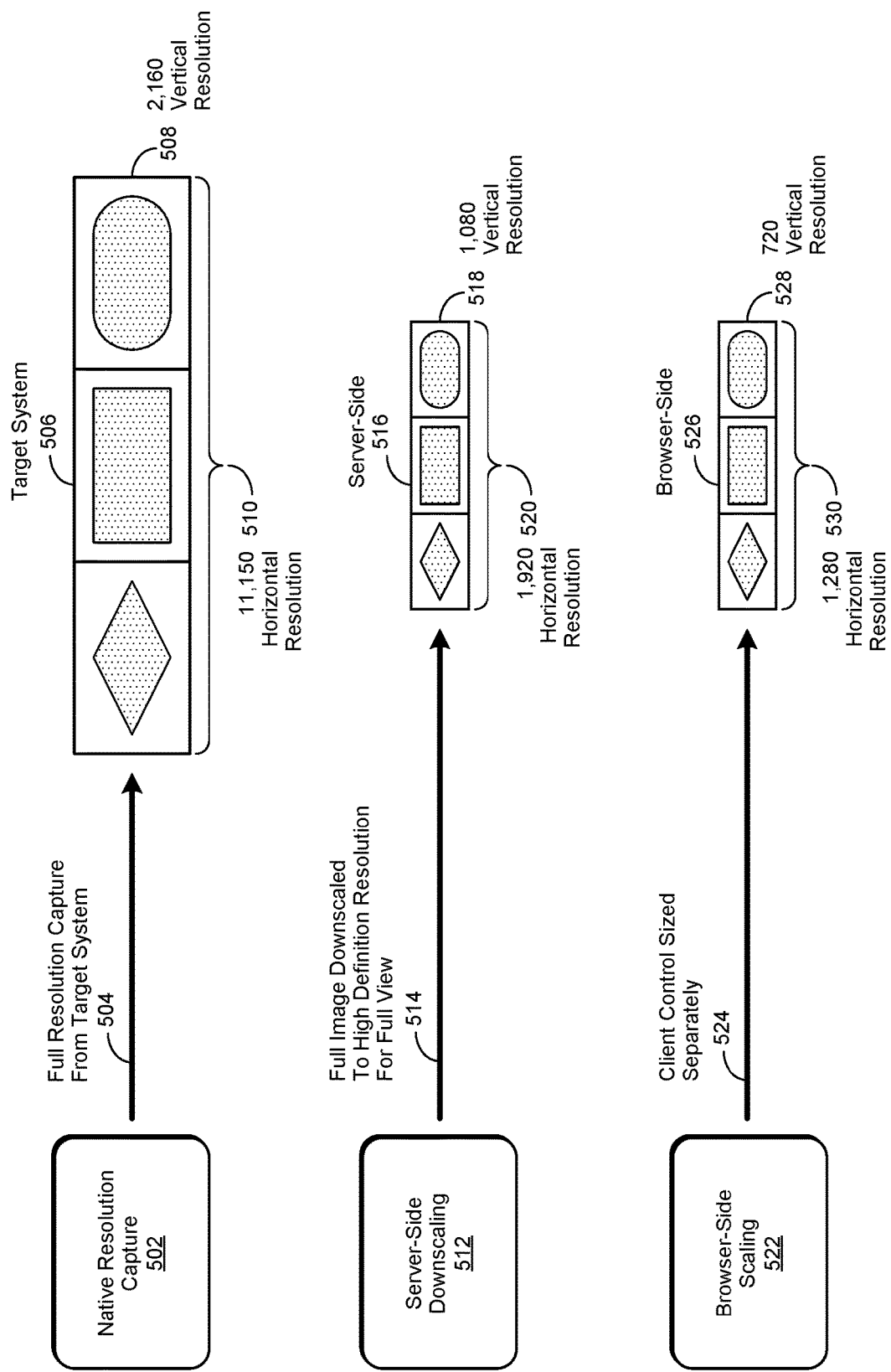
FIGS. 5a and 5b are a simplified diagram of the operation of a video bandwidth reduction system implemented to scale the size and resolution of a stream of monitored high-density content within a scalable viewport.
Figure 5B:
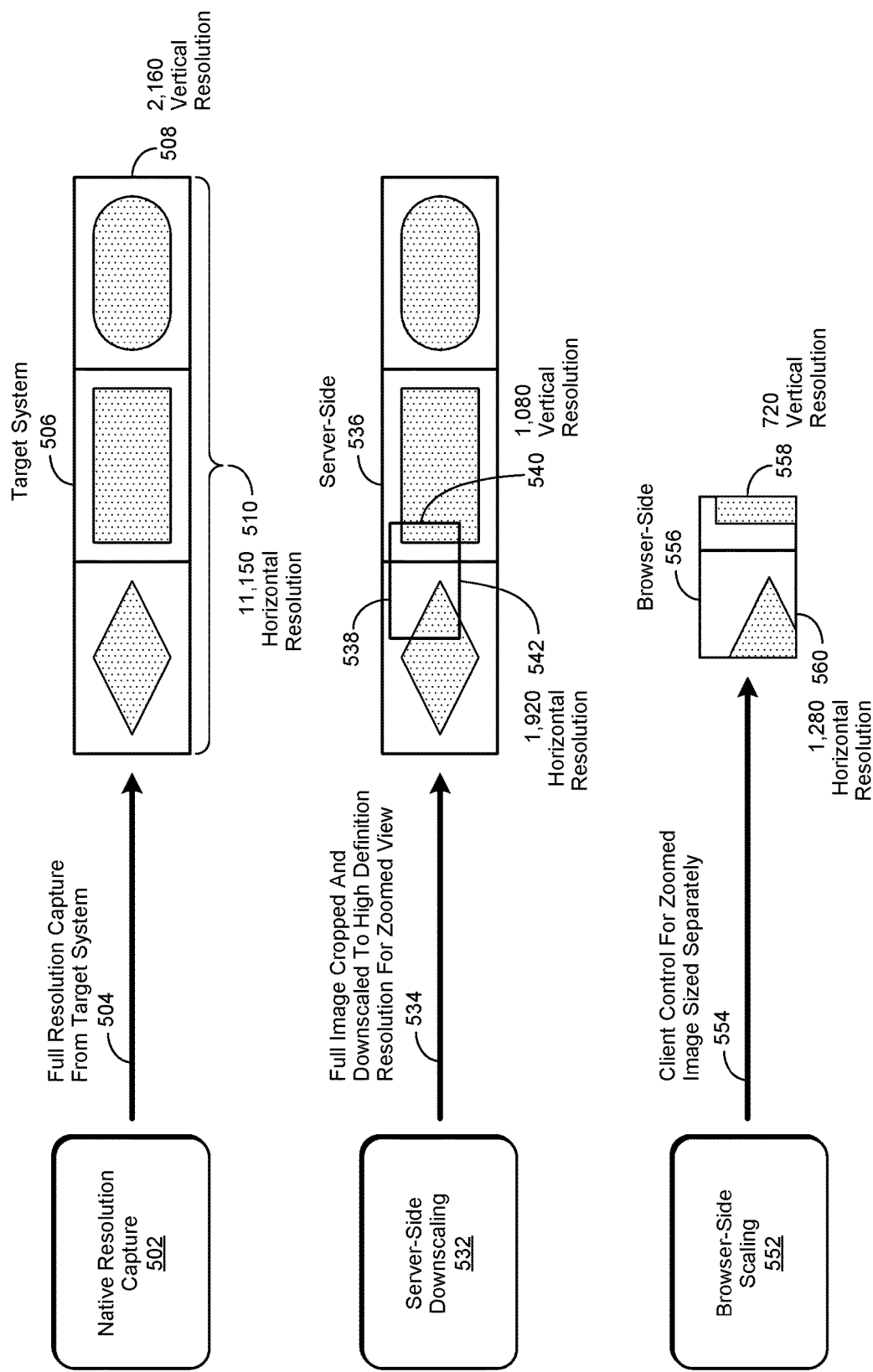

FIGS. 5*a* and 5*b* are a simplified diagram of the operation of a video bandwidth reduction system implemented in accordance with an embodiment of the invention to scale the size and resolution of a stream of monitored high-density content within a scalable viewport. In certain embodiments, a video bandwidth reduction system may be implemented to monitor a user's interaction with certain high-density content displayed within a user interface (UI) of a target endpoint device. In certain embodiments, an endpoint agent, likewise described in greater detail herein, may be implemented to capture high-density image frame information corresponding to the high-density content displayed within the user interface (UI) of the target endpoint device. In certain embodiments, the endpoint agent may be implemented to capture a stream of individual high-density image frames.

In certain embodiments, one or more of these individual high-density image frames may be captured 502 in its native resolution. As an example, a monitored user may interact with high-density content displayed across three Ultra High Definition (UHD) displays, each of which has a native resolution of 3,840×2,160 pixels. In this example, the combined native resolution 502 of the three displays would be 11,520 pixels horizontal 510 resolution by 2,160 pixels vertical 508 resolution. In certain embodiments, this full resolution, high-density image frame information may be captured 504 and provided to an application server, along with associated event and contextual information, as described in greater detail herein. In certain embodiments, the application server may be implemented to store the captured 504 high-density image frame information at its full resolution, along with its associated event and contextual information, as high-density monitored content in an associated repository.

As likewise described in greater detail herein, the application server may be implemented in certain embodiments to support a security application. In certain embodiments, the application server may be implemented to provide the event and contextual information associated with the captured 504 full resolution, high-density image frame to the security application. In certain embodiments, the security application may be implemented to use the event and contextual information to identify suspicious user behavior and associated high-density image frame information stored in the repository of monitored high-density content. In certain embodiments, a video bandwidth reduction system may be implemented to display the full resolution, high-density image frame information within a UI 506 of an associated security analyst system.

In certain embodiments, a video bandwidth reduction system and an endpoint agent may be implemented, individually or in combination, to reduce the consumption of network bandwidth when monitoring a user's interaction with high-density content displayed within a UI of an associated endpoint device. Certain aspects of the invention reflect an appreciation that lossy video compression algorithms may reduce the size amount of video information corresponding to a high-definition image frame, which may in turn reduce the amount of network bandwidth required for its communication. However, certain aspects of the invention likewise reflect an appreciation that the benefits of such lossy video compression approaches may be at the expense of the loss of image detail, which may compromise the usefulness of the compressed video information for security monitoring purposes.

Likewise, certain aspects of the invention reflect an appreciation that the use of typical lossy video compression approaches generally takes longer to compress a stream of high-density image frames than the actual time period the stream of high-density image frames represent. As an example, a lossy video compression algorithm may take 30 seconds to compress a 20 second stream of high-definition image frames. Certain embodiments of the invention likewise reflect an appreciation that such processing requires additional compute cycles, and associated resources, which may further offset the benefits that lossy video compression approaches may represent when used for security monitoring purposes.

Certain embodiments of the invention reflect a further appreciation that effective monitoring of user interactions with high-definition content displayed within a UI of an associated endpoint device typically requires high levels of image detail provided in real-time to a security application. Furthermore, the provision of such image detail should not be at the expense of consuming large amounts of network bandwidth or computing resources. Likewise, certain aspects of the invention reflect an appreciation that visual acuity may be more important than smoothness of motion when a stream of high-definition image frames is replayed for the purpose of security monitoring.

Accordingly, the endpoint agent may be implemented in certain embodiments to capture high-density image frame information less frequently (e.g., 1 to 4 frames per second) rather than its typically-implemented refresh rate (e.g., 30, 60, 120, 240 frames per second, etc.). In certain embodiments, the endpoint agent may be implemented to intermittently capture the high-density image frame information for a certain interval of time (e.g., 20 seconds). In certain embodiments, the endpoint agent may be implemented to capture the entirety of each high-density image frame within such a time interval at its full native resolution.

In certain embodiments, the endpoint agent may be implemented to capture the entirety of the first high-density image frame within a certain period of time at its full native resolution, yet only capture those areas of subsequent high-density image frames that change. In these embodiments, those areas of subsequent high-density image that change are collected at their full native resolution. Accordingly, no visual acuity is lost when those captured frames are replayed in a stream. In certain embodiments, the endpoint agent may be implemented to repeat the capture of high-density image frames for a certain number of time intervals. In these embodiments, the method by which the initiation of such collection is determined, the number of time intervals such collection is performed, and the method by which such collection is terminated, is a matter of design choice.

In certain embodiments, the captured high-density image frames are communicated by the endpoint agent via a network to an application server hosting a security application, as described in greater detail herein. In various embodiments, the application server may be implemented to provide the high-density image frames it receives to a video bandwidth reduction system to reduce their native resolution to a lower resolution. In certain embodiments, the video bandwidth reduction system may be implemented to perform of server-side downscaling 512 operations to reduce the native resolution (e.g., 3,840×2,160 pixels) of each high-density image frame to a downscaled 514 resolution, such as 1,920 pixels horizontal 520 resolution by 1,080 pixels vertical 518 resolution.

In certain embodiments, the resulting server-side 516 downscaled 514 high-density image frames are subsequently stored as high-density monitored content in an associated repository. In various embodiments, one or more high-density image frames are retrieved from a repository of high-density monitored content and provided to a security analyst system for display. In certain of these embodiments, downscaling 522 operations are performed 524 within the UI of the security analyst system to downscale the high-density image frames to a lower resolution. As an example, the high-density image frames may be stored at a resolution of 1,920×1,080 pixels in a repository of high-density monitored content, yet displayed at 1,280 pixels horizontal 530 resolution by 720 pixels vertical 528 resolution within the UI 526 of the security analyst system.

In various embodiments, a security analyst system may be implemented to request a particular area of interest 538 within one or more high-density image frames be retrieved from a repository of high-density monitored content and down-scaled to a certain resolution. In certain of these embodiments, the video bandwidth reduction system may be implemented to perform of server-side 532 downscaling 534 operations to downscale the native resolution (e.g., 3,840× 2,160 pixels) of the area of interest 538 within each of the high-density image frames to a lower resolution, such as 1,920 pixels horizontal 542 resolution by 1,080 pixels vertical 540 resolution. In certain embodiments, the resulting down-scaled region of interest 538 may then be provided to the security analyst system for display within its associated UI.

In various embodiments, one or more high-density image frames are retrieved from a repository of high-density monitored content and provided to a security analyst system for display. In certain of these embodiments, downscaling 552 operations are performed 554 within the UI of the security analyst system to downscale a region of interest within the high-density image frames to a lower resolution. As an example, the high-density image frames may be stored at a resolution of 1,920×1,080 pixels in a repository of high-density monitored content, yet the region of interest may be displayed at 1,280 pixels horizontal 560 resolution by 720 pixels vertical 558 resolution within the UI 556 of the security analyst system. Skilled practitioners of the art will recognize that many such embodiments are possible. Accordingly, the foregoing is not intended to limit the spirit, scope or intent of the invention.

Figure 6:
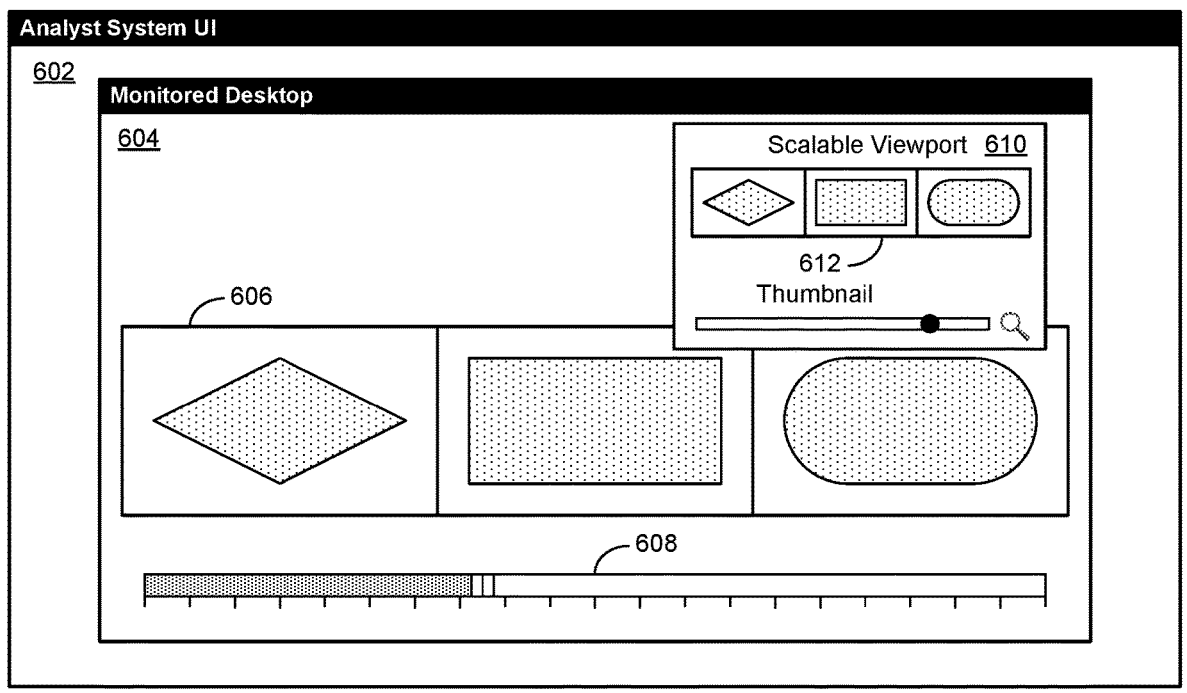
FIG. 6 shows a thumbnail image of a stream of monitored high-density content displayed within a scalable viewport.

FIG. 6 shows a thumbnail image of a stream of monitored high-density content displayed within a scalable viewport implemented in accordance with an embodiment of the invention. In this embodiment, a thumbnail image 612 of high-density monitored content, described in greater detail herein, is displayed within a scalable viewport 458, which in turn is displayed within the user interface (UI) 454 of a security analyst system. In certain embodiments, as described in greater detail herein, the high-density monitored content 620 may be displayed at a particular resolution (e.g., 560×720 pixels) within a monitored UI 456 window, which in turn is displayed within the UI 454 of a security analyst system. In various embodiments, the monitored UI 456 window may be implemented with a sequence control 608, which allows individual frames within a stream of high-density image frames to be displayed within the monitored UI 456 window.

Figure 7:
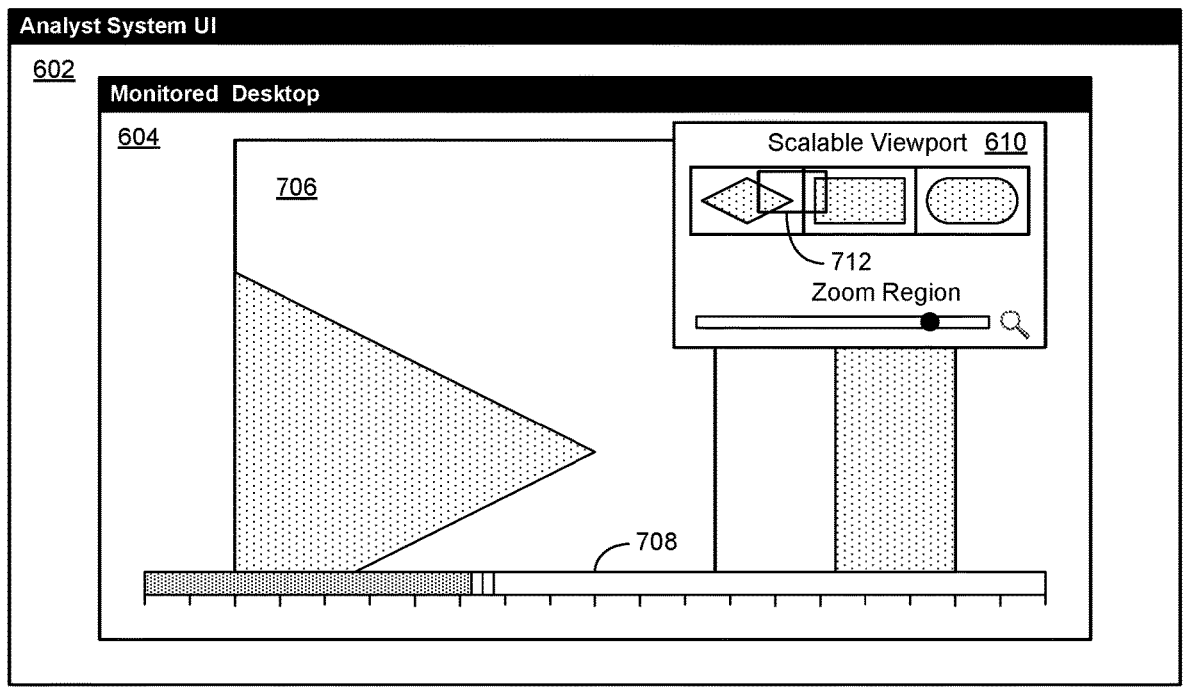
FIG. 7 shows a selected region of interest within a stream of monitored high-density content displayed within a scalable viewport.

FIG. 7 shows an enlarged region of interest within a stream of monitored high-density content displayed within a scalable viewport implemented in accordance with an embodiment of the invention. In this embodiment, a region of interest 712 within high-density monitored content, described in greater detail herein, is displayed within a scalable viewport 458, which in turn is displayed within the user interface (UI) 454 of a security analyst system. In certain embodiments, as described in greater detail herein, the region of interest 712 may be displayed as a zoomed 706 region of interest 712 at a particular resolution (e.g., 560×720 pixels) within a monitored UI 456 window, which in turn is displayed within the UI 454 of a security analyst system. In various embodiments, the monitored UI 456 window may be implemented with a sequence control 608, which allows the zoomed 706 region of interest 712 to be displayed within individual frames of a stream of high-density image frames displayed within the monitored UI 456 window.

Figure 8:
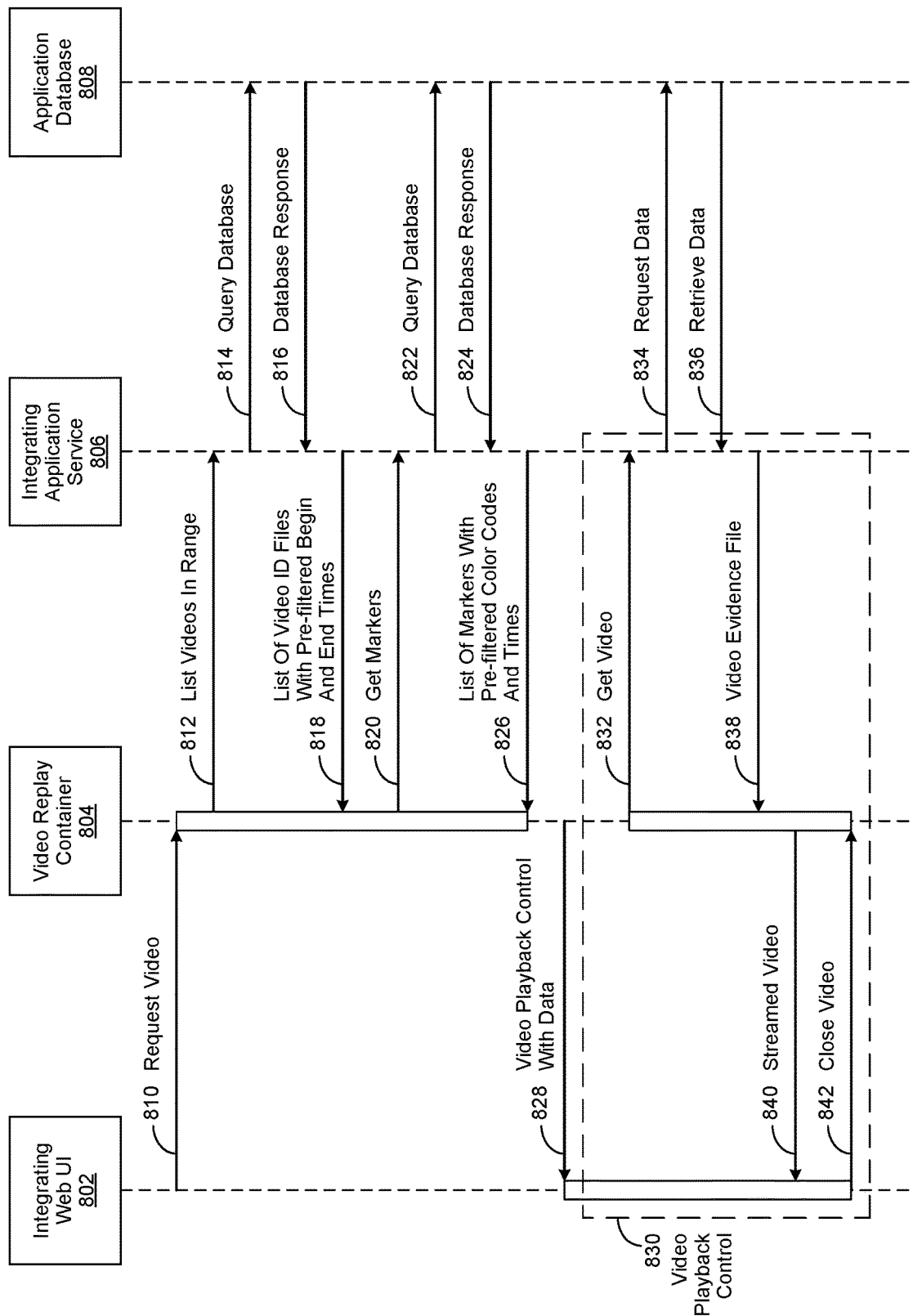
FIG. 8 shows a generalized process flow of the operation of a video bandwidth reduction system.

FIG. 8 shows a generalized process flow of the operation of a video bandwidth reduction system implemented in accordance with an embodiment of the invention. In this embodiment, an integrating user interface (UI) 802, such as a UI commonly associated with a security analyst system, requests 810 certain high-density image frames from a video replay container 804, described in greater detail herein. In turn, the video replay container 804 provides 812 a list of high-density image frames within the range of requested high-density image frames to an integrating application service 806, such as an application server, likewise described in greater detail herein. In turn the integrating application service 806 queries 814 a repository of high-density monitored content for the requested list of high-density image frames.

In response, the repository of high-density image frames responds 816 to the integrating application service 806 with the requested list of high-density image frames. In turn, the integrating application service 806 provides 818 the list of high-density image frame identifiers to the video replay container 804. In certain embodiments, the list of high-density image frame identifiers may be pre-filtered with begin and end times corresponding to a particular stream of high-density image frames. In response, the video replay container 804 submits 820 a "get list of markers" request to the integrating application service 806, which in turn, submits a query 822 for the requested list of markers to the repository of high-density monitored content 808.

In response, the repository of high-density image frames responds 824 to the integrating application service 806 with the requested list of markers. In turn, the integrating application service 806 provides 826 the list of markers to the video replay container 804. In certain embodiments, the list of markers may be pre-filtered with color codes, begin and end times corresponding to a particular stream of high-density image frames, or a combination thereof. In turn, the video replay container 804 submits 828 high-density image frame play back controls, and associated high-density image frame data, to the integrating UI 802 to initiate high-density image frame stream playback control operations 830.

In certain embodiments, the high-density image frame stream playback control operations 830 include the video replay container 804 submitting 832 a "get high-density image frame(s)" request to the integrating application service 806. In turn, the integrating application service 806 submits 834 a list of the requested high-density image frames to the repository of high-density monitored content 808. In response, the repository of high-density content provides 836 the requested high-density image frames to the integrating application service 806, which in turn provides 838 a high-density image frame evidence file to the video replay container 804. In turn, the video replay container 804 provides 840 a stream of high-density image files to the integrating UI 802, where they are displayed. In certain embodiments, the integrating UI 802 may submit 842 a "close stream" command to the video replay container 804, which concludes high-density image frame stream playback control operations 830.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a bandwidth reduction operation, comprising:
receiving a plurality of streams of high-density image frames from a respective plurality of monitored devices, each of the plurality of monitored devices comprising a protected endpoint, each of the plurality of streams of high-density image frames representing a full resolution screen capture of a display of a monitored device from the respective plurality of monitored devices, the protected endpoint comprising an endpoint agent executing on an endpoint device, the endpoint agent being implemented to provide a common infrastructure for a pluggable feature pack, the pluggable feature pack providing a security management function, the pluggable feature pack comprising a frame capture pack, the frame capture pack providing the security management function of capturing high-density image frames in response to an occurrence of a particular user behavior;
storing the plurality of streams of high-density image frames within a monitored content repository;
identifying a subset of the plurality of streams of high-density image frames for increased scrutiny, the subset of the plurality of streams of high-density image frames being identified for increased scrutiny in response to a notification of suspicious user behavior, the suspicious user behavior including a user interaction with certain high-density content; and,
presenting a portion of the subset of the plurality of streams of high-density image frames within a scalable viewport for investigation by a security analyst, the portion of the subset of the plurality of streams of high-density image frames comprising the certain high-density content captured by the protected endpoint in response to the occurrence of the particular user behavior, the scalable viewport comprising a viewport implemented to scale a viewable area and resolution of a particular viewport, the scalable viewport being scaled to present the certain high-density content larger or smaller.

2. The method of claim 1, further comprising:
processing the subset of the plurality of streams of high-density image frames via a video replay container to provide to portion of the subset of the plurality of streams of high-density images frames for presentation within the scalable viewport.

3. The method of claim 2, wherein:
the portion of the subset of the plurality of streams of high-density image frames are provided from the video replay container to the scalable viewport via a web socket stream.

4. The method of claim 1, wherein:
each of the plurality of streams of high-density image frames comprise a plurality of high-density image frame files, each of the plurality of high-density image frame files, each high density image frame file comprising, for a predetermined period of time, a full frame representation of the respective monitored device and a plurality of differential frame representations of the respective monitored device.

5. The method of claim 4, wherein:
the plurality of differential frame representations of the respective monitored device correlate with a predefined frame capture frequency for the respective monitored device.

6. The method of claim 1, wherein:
the high-density image frame corresponds to a first resolution; and,
the portion of the subset of the plurality of streams of high-density image frames within a scalable viewport corresponds to a second resolution, the second resolution enabling viewing of static content of the high-density image frame.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving a plurality of streams of high-density image frames from a respective plurality of monitored devices, each of the plurality of monitored devices comprising a protected endpoint, each of the plurality of streams of high-density image frames representing a full resolution screen capture of a display of a monitored device from the respective plurality of monitored devices, the protected endpoint comprising an endpoint agent executing on an endpoint device, the endpoint agent being implemented to provide a common infrastructure for a pluggable feature pack, the pluggable feature pack providing a security management function, the pluggable feature pack comprising a frame capture pack, the frame capture pack providing the security management function of capturing high-density image frames in response to an occurrence of a particular user behavior;
storing the plurality of streams of high-density image frames within a monitored content repository;
identifying a subset of the plurality of streams of high-density image frames for increased scrutiny, the subset of the plurality of streams of high-density image frames being identified for increased scrutiny in response to a notification of suspicious user behavior, the suspicious user behavior including a user interaction with certain high-density content; and,
presenting a portion of the subset of the plurality of streams of high-density image frames within a scalable viewport for investigation by a security analyst, the portion of the subset of the plurality of streams of high-density image frames comprising the certain high-density content captured by the protected endpoint in response to the occurrence of the particular user behavior, the scalable viewport comprising a viewport implemented to scale a viewable area and resolution of a particular viewport, the scalable viewport being scaled to present the certain high-density content larger or smaller.

8. The system of claim 7, wherein the instructions executable by the processor are further configured for:
processing the subset of the plurality of streams of high-density image frames via a video replay container to provide to portion of the subset of the plurality of streams of high-density images frames for presentation within the scalable viewport.

9. The system of claim 8, wherein:
the portion of the subset of the plurality of streams of high-density image frames are provided from the video replay container to the scalable viewport via a web socket stream.

10. The system of claim 7, wherein:
each of the plurality of streams of high-density image frames comprise a plurality of high-density image frame files, each of the plurality of high-density image frame files, each high density image frame file comprising, for a predetermined period of time, a full frame representation of the respective monitored device and a plurality of differential frame representations of the respective monitored device.

11. The system of claim 10, wherein:
the plurality of differential frame representations of the respective monitored device correlate with a predefined frame capture frequency for the respective monitored device.

12. The system of claim 7, wherein:
the high-density image frame corresponds to a first resolution; and,
the portion of the subset of the plurality of streams of high-density image frames within a scalable viewport corresponds to a second resolution, the second resolution enabling viewing of static content of the high-density image frame.

13. A non-transitory, computer-readable storage medium embodying computer program code, the computer program code comprising computer executable instructions configured for:
receiving a plurality of streams of high-density image frames from a respective plurality of monitored devices, each of the plurality of monitored devices comprising a protected endpoint, each of the plurality of streams of high-density image frames representing a full resolution screen capture of a display of a monitored device from the respective plurality of monitored devices, the protected endpoint comprising an endpoint agent executing on an endpoint device, the endpoint agent being implemented to provide a common infrastructure for a pluggable feature pack, the pluggable feature pack providing a security management function, the pluggable feature pack comprising a frame capture pack, the frame capture pack providing the security management function of capturing high-density image frames in response to an occurrence of a particular user behavior;
storing the plurality of streams of high-density image frames within a monitored content repository;
identifying a subset of the plurality of streams of high-density image frames for increased scrutiny, the subset of the plurality of streams of high-density image frames being identified for increased scrutiny in response to a notification of suspicious user behavior, the suspicious user behavior including a user interaction with certain high-density content; and,
presenting a portion of the subset of the plurality of streams of high-density image frames within a scalable viewport for investigation by a security analyst, the portion of the subset of the plurality of streams of high-density image frames comprising the certain high-density content captured by the protected endpoint in response to the occurrence of the particular user behavior, the scalable viewport comprising a viewport implemented to scale a viewable area and resolution of a particular viewport, the scalable viewport being scaled to present the certain high-density content larger or smaller.

14. The non-transitory, computer-readable storage medium of claim 13, wherein the computer executable instructions are further configured for:

processing the subset of the plurality of streams of high-density image frames via a video replay container to provide to portion of the subset of the plurality of streams of high-density images frames for presentation within the scalable viewport.

15. The non-transitory, computer-readable storage medium of claim 14, wherein:

the portion of the subset of the plurality of streams of high-density image frames are provided from the video replay container to the scalable viewport via a web socket stream.

16. The non-transitory, computer-readable storage medium of claim 13, wherein:

each of the plurality of streams of high-density image frames comprise a plurality of high-density image frame files, each of the plurality of high-density image frame files, each high density image frame file comprising, for a predetermined period of time, a full frame representation of the respective monitored device and a plurality of differential frame representations of the respective monitored device.

17. The non-transitory, computer-readable storage medium of claim 16, wherein:

the plurality of differential frame representations of the respective monitored device correlate with a predefined frame capture frequency for the respective monitored device.

18. The non-transitory, computer-readable storage medium of claim 13, wherein:

the high-density image frame corresponds to a first resolution; and, the portion of the subset of the plurality of streams of high-density image frames within a scalable viewport corresponds to a second resolution, the second resolution enabling viewing of static content of the high-density image frame.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

* * * * *